Figure 1:
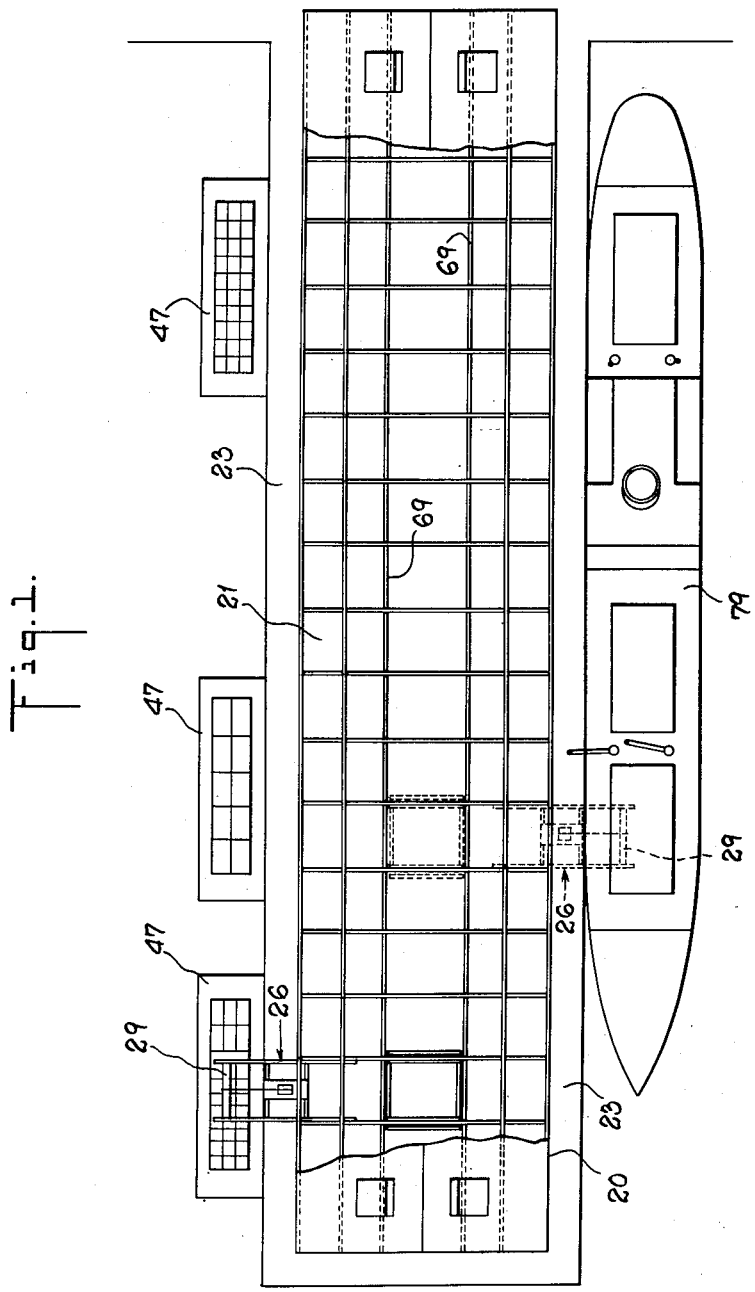

May 28, 1957 J. A. FETCHKO 2,793,766
CARGO HANDLING DEVICE
Filed June 3, 1954 7 Sheets-Sheet 1

INVENTOR.
JOSEPH A. FETCHKO
BY Edward Halle
ATTORNEY

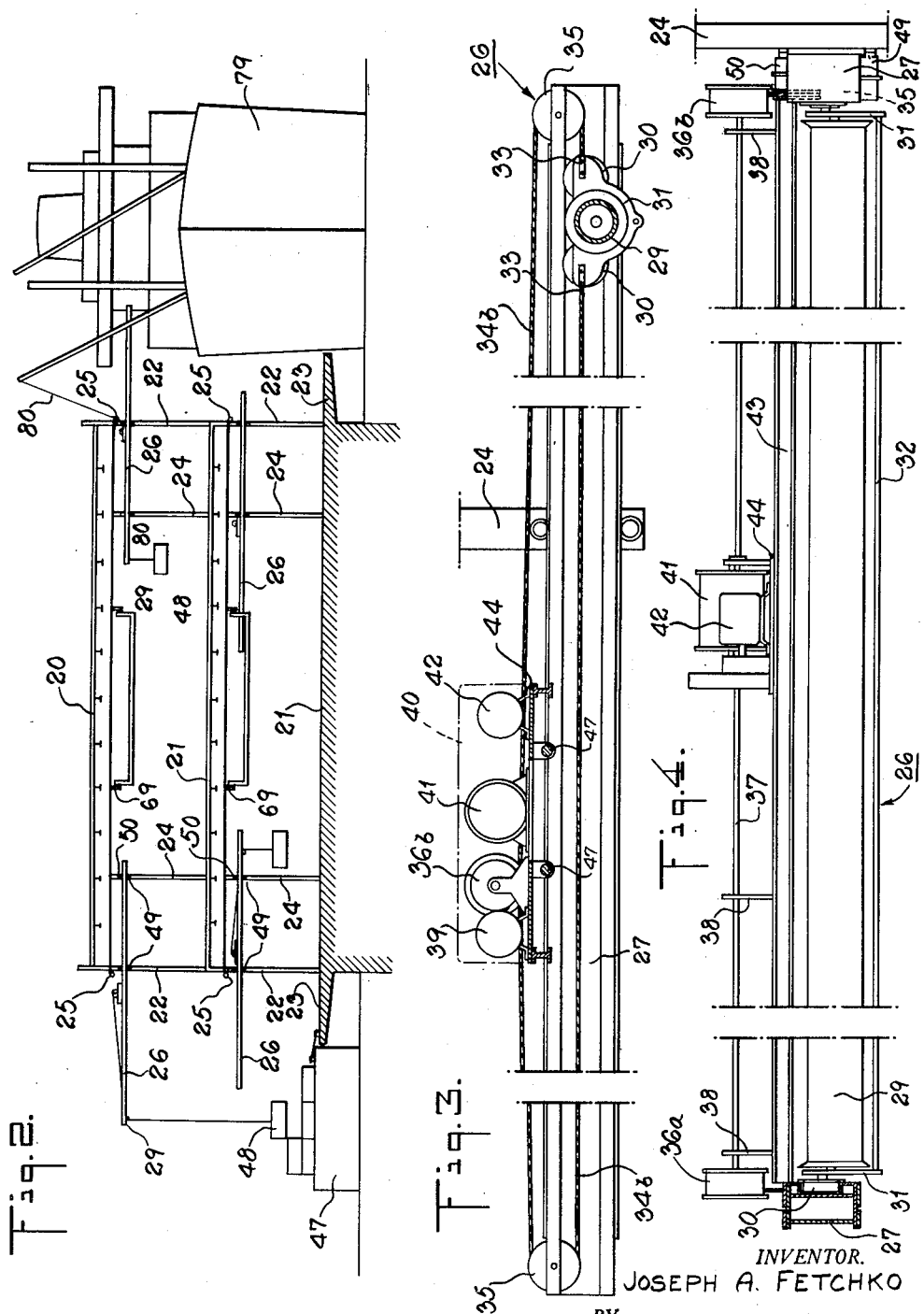

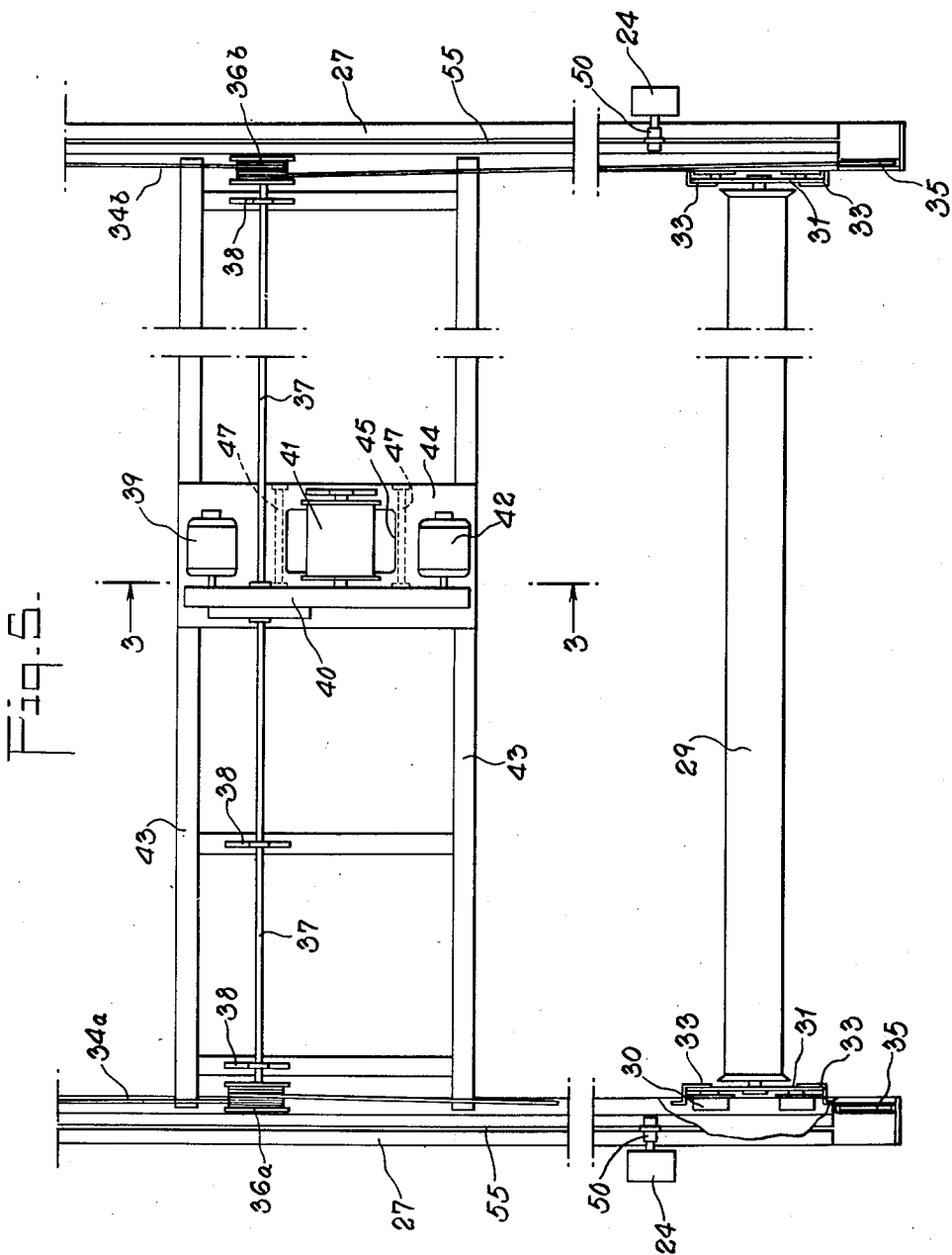

May 28, 1957 J. A. FETCHKO 2,793,766
CARGO HANDLING DEVICE
Filed June 3, 1954 7 Sheets-Sheet 4
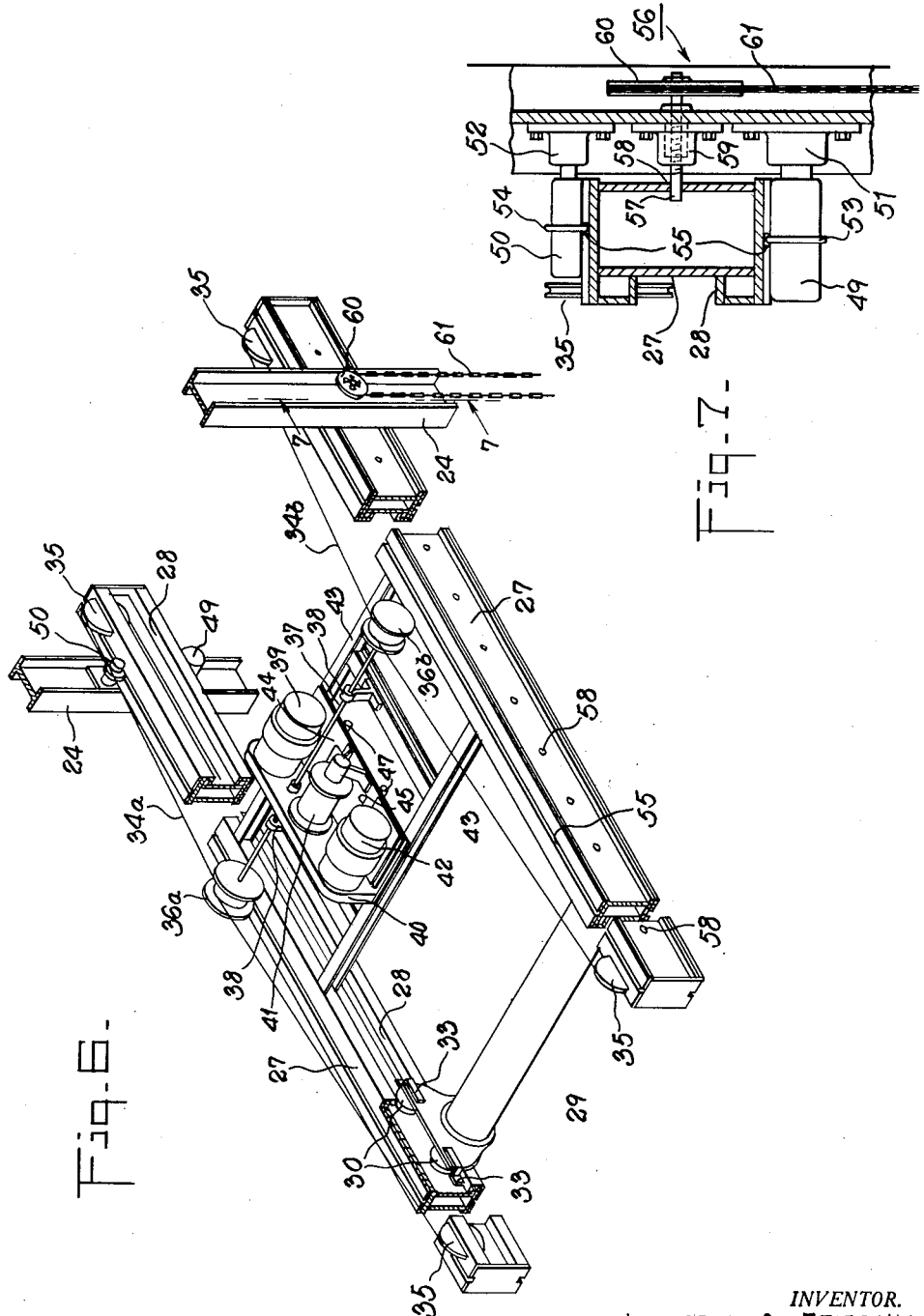
INVENTOR.
JOSEPH A. FETCHKO
BY Edward Halle
ATTORNEY

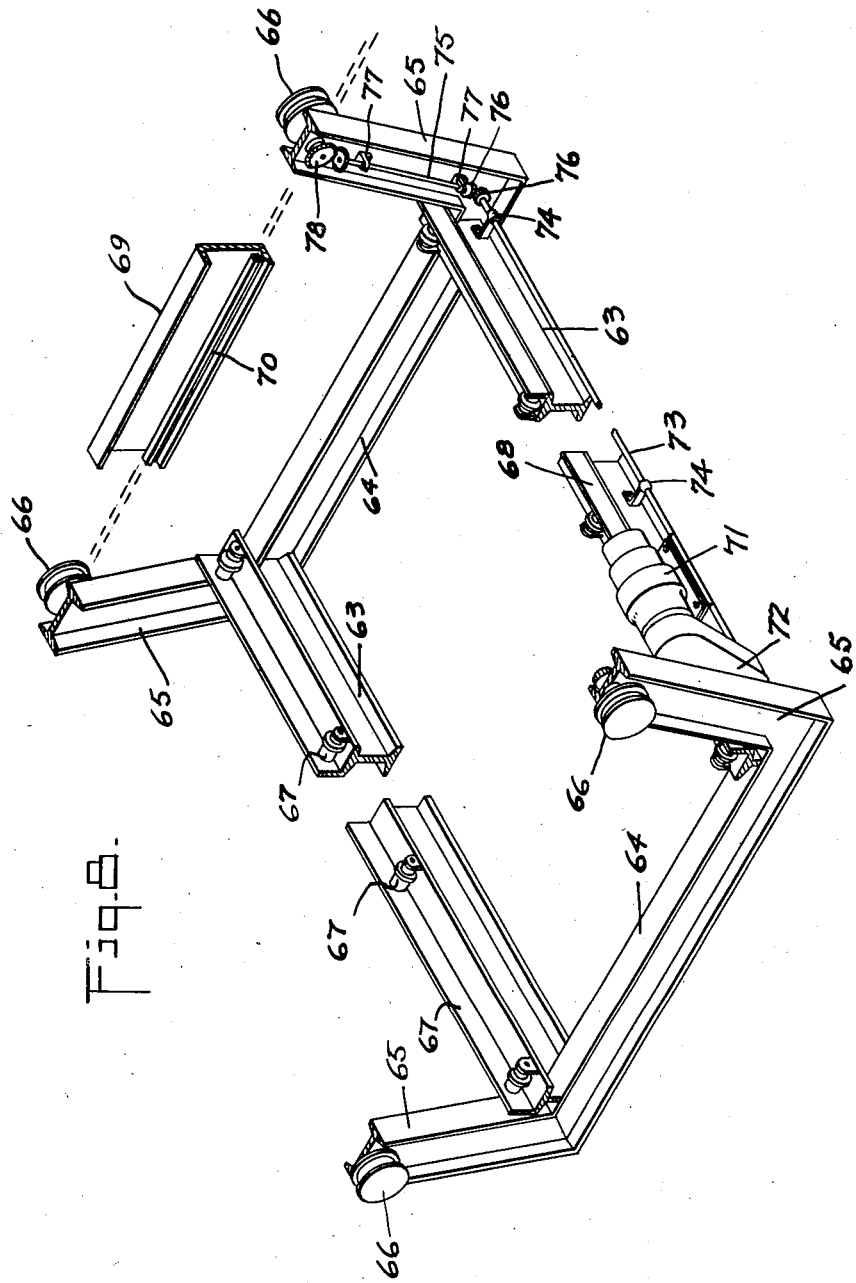

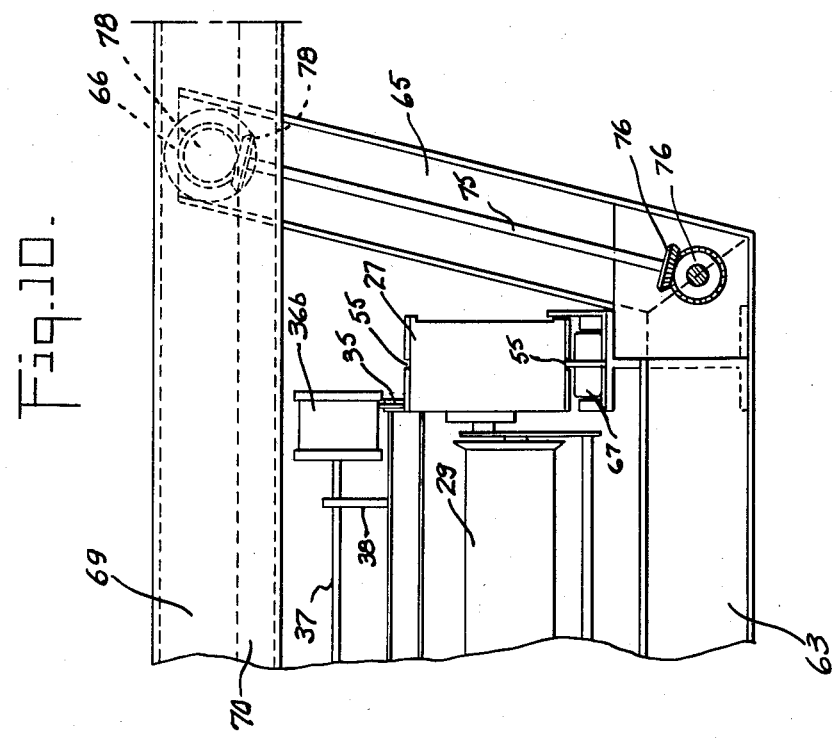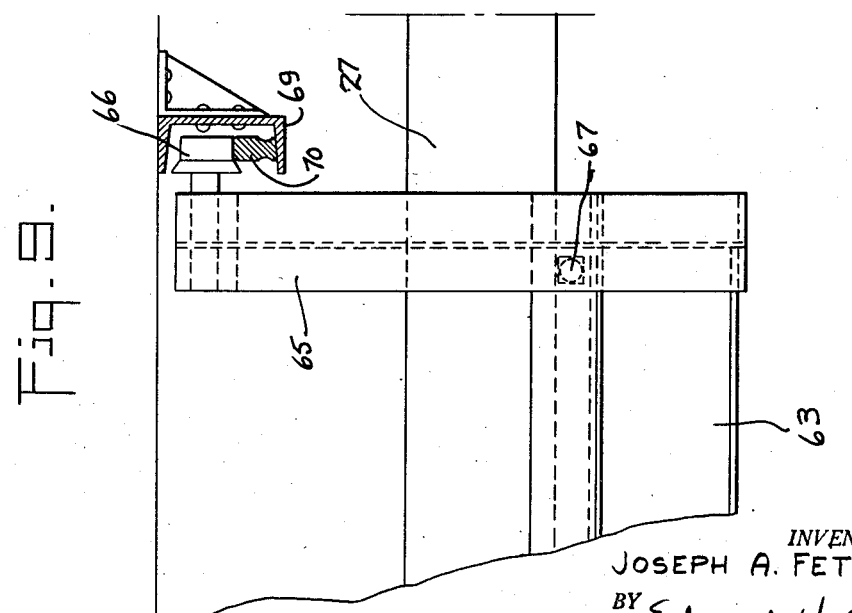

May 28, 1957  J. A. FETCHKO  2,793,766
CARGO HANDLING DEVICE
Filed June 3, 1954  7 Sheets-Sheet 7
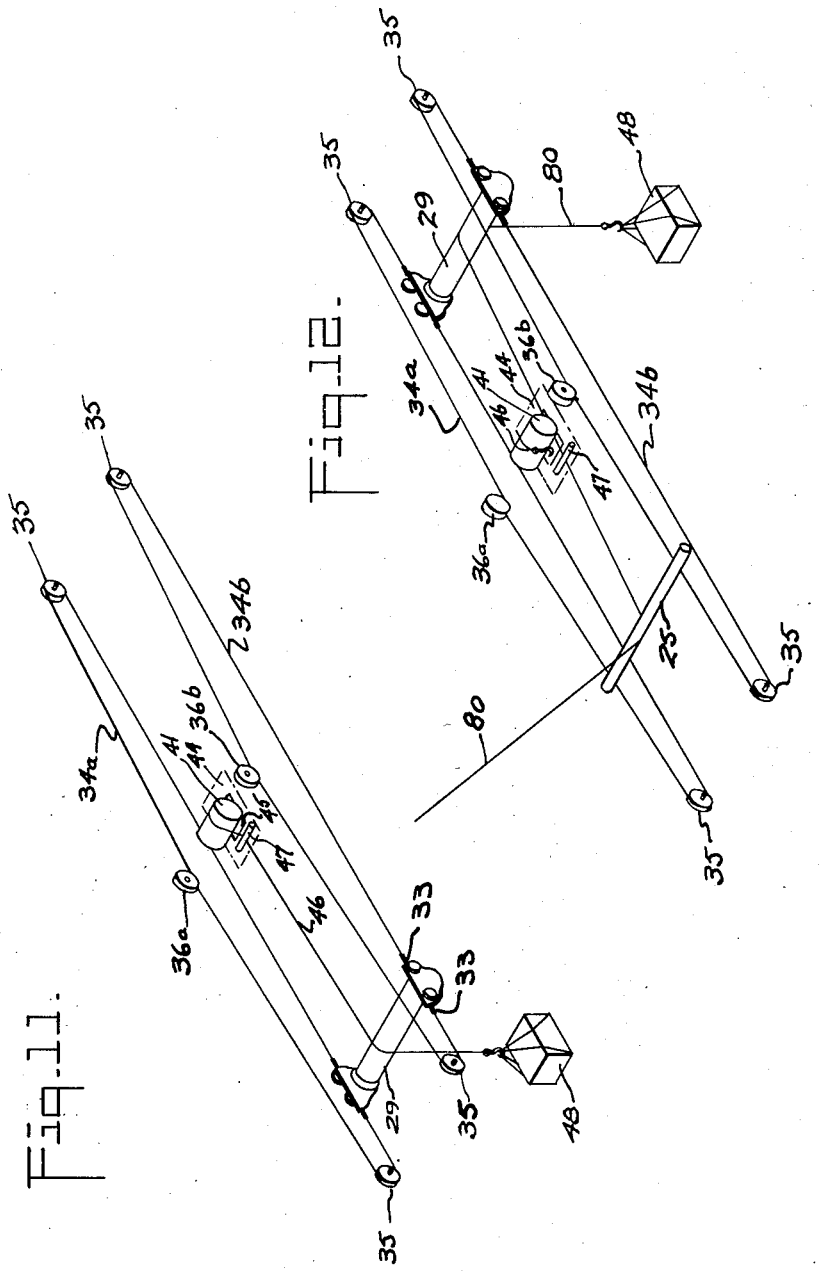
INVENTOR.
JOSEPH A. FETCHKO
BY Edward Halle
ATTORNEY

United States Patent Office 2,793,766
Patented May 28, 1957

---

2,793,766

CARGO HANDLING DEVICE

Joseph A. Fetchko, Bayonne, N. J.

Application June 3, 1954, Serial No. 434,253

5 Claims. (Cl. 214—16)

My invention relates to a new type of cargo loading and discharging device. The ease with which cargo can be handled between piers and ships depends much more upon the width of the "apron" than upon the size of the terminal, the apron being the open section of the pier between the covered shed and the water's edge. It is that portion of the pier from which cargo is lifted when a ship is being loaded and/or where the cargo is first landed from the ship when being discharged.

With many piers this apron is narrow or no apron at all. This arrangement places a direct limit on cargo handling speeds. When loading cargo from the pier to the ship, the sling loads have to be made up inside the shed and held by the longshoremen while it is being hoisted to keep it from striking the edge of the ship. While transferring cargo from the ship to the pier, a draft cannot be landed until another is moved away. So that while the longshoremen on the pier are breaking down or sorting a slingload, the hook attached to the ship's cargo runner either stands idle or hangs over the deck of the ship with another load of cargo waiting to be lowered onto the apron. This extra care, work, and idle time both in loading and discharging reduces the number of cargo handling cycles per hour and slows down the entire operation.

An additional problem arises when handling cargo from the ship to and from the second level of the pier. Cargo to the pier is worked through a door at the second level of the pier. The longshoremen must stand on a small, outwardly projecting temporary platform to swing the slingload into the shed. This precarious process creates hazards and is time consuming as well.

This problem of cargo handling is not only limited to ships, but to barges and the like. Their means of transferring cargo is also different. For the transfer between the ship is carried by the ship's cargo runner while the transfer to and from a barge is by hand trucks, fork trucks, portable conveyors or house falls and the like. When using the hand or fork trucks, a gangway is rigged between the pier and barge. Here, however, a difficulty arises when there is a difference in the level between the barge and pier owing to the variations in the tide or draft of the vessel. The problem is further aggravated when there is a need to handle the cargo to the second level of the pier. Then the slow and tedious house fall must be used. The danger of handling a swinging draft of cargo close to the open doorway high on the second level still exists. My invention eliminates the above problems.

It is a further object of my invention to provide a device of simple construction to accomplish loading and discharging of cargo to and from ships so that the cargo gear of the ship may be utilized within the pier shed without the necessity of having separate cargo gear within the shed and duplicating operations within the shed.

It is a further object of my invention to provide such a device with separate cargo handling gear inside the pier shed which may be adapted to discharge and load cargo from barges at the side of the pier if such barges do not have cargo handling gear of their own.

Another object of my invention is to provide such a device to transfer the cargo to points well inside the pier shed so as to eliminate the usual hazards of handling the cargo within the shed, especially on the second level of the pier.

Another object of my invention is to provide a cargo loading and unloading device that may be moved to operate to any doorway on either side of the whole length of the pier.

Other objects and advantages will be apparent from the following description when read in connection with the accompanying drawings in which Fig. 1 is a plan view with portions cut away;

Fig. 2 a cross-section;

Fig. 3 a cross-section of a boom unit of my device with portions cut away;

Fig. 4 an end plan view of a boom unit of my device showing a cross-section of the boom on the left side of the figure;

Fig. 5 a top plan view of sections of a boom unit with a portion of the end of one of the booms cut away to show the disposition of the supporting wheels of the movable roller;

Fig. 6 a perspective view of a boom unit with portions cut away to show details of construction;

Fig. 7 a cross-section of a portion of Figure 6 along the lines 7—7 therein;

Fig. 8 a perspective view of the boom unit carrier of my device;

Fig. 9 a detail of a portion of the boom unit carrier of my device;

Fig. 10 another detail of the boom unit carrier;

Fig. 11 a schematic diagram of the reeving arrangement of the self-contained cargo gear of my device; and Fig. 12 a schematic diagram of the reeving arrangement employed when my device is used in conjunction with a vessel's cargo running gear.

Similar numerals refer to similar parts throughout the several views.

The main frame of my device is the pier shed 20. It has floors 21 and doorways 22. The section of the floor 21 which extends from the area of the doorway 22 to the edge of the pier is the apron 23. A horizontal longitudinal roller 25 is located over each doorway 22 so that the bottom edge of the roller will be outside of and beneath the upper part of the opening of the doorway 22. Upright stanchions 24 serve to support the pier shed 20. The entire device is built around one or more boom units 26 which comprise a pair of metal booms 27. Each boom 27 is so shaped on each of its inner sides to provide a runway 28. A movable roller 29 rides the full length of the boom unit 26 by means of wheels 30 which are attached to end plates 31 which are, in turn, attached to each end of the movable roller 29. The movable roller 29 is so connected to the end plates 31 that it rotates freely. I have also provided an anti-racking bar 32 which is disposed beneath the movable roller 29 being attached at its ends to the end plates 31. I have provided haulage bars 33 at the sides of each end plate 31 to which the hauling cables 34a and 34b are attached. At the end of each boom 27, sheaves 35 are located. The hauling wires 34a and 34b are reeved over the end sheaves 35 to winding drums 36a and 36b located over the central portion of each boom unit 26, so that rotation of the winding drums 36a and 36b will result in moving the movable roller 29 from one end of the boom unit 26 to the other as desired.

The drums 36a and 36b are rotated by shafts 37 which are supported by shaft bearings 38. The winding drum shafts 37 are powered by a reversible electric haulage motor 39 through a gear train or similar means within the gear housing 40. Also contained within the gear housing 40 is a train of gears or similar means which connects a hoisting drum 41 with a reversible electric hoisting motor 42. Frames 43 rigidly connect the booms 27 and provide support for a platform 44 on which the motors 39 and 42, the gear housing 40 and the hoisting drum 41 are positioned and firmly secured in proper relation to each other.

I have provided an opening 45 in the platform 44 directly beneath the hoisting drum 41 so that cargo wire 46 may be unreeled from the hoisting drum 41 and dropped through the opening 45 and then run over the movable roller 29. The cargo wire 46 is guided by rotatable roller guides 47 located below and near the edges of the opening 45. This arrangement permits the hoisting drum 41 and its cargo wire 46 to be used to handle cargo from water crafts, such as barges 47, which do not have their own cargo handling gear.

It is apparent that when the movable roller 29 engages the cargo wire 46 and is moved laterally away from the hoisting drum 41, the cargo load 48 will be drawn up upwardly if the hoisting drum 41 remains stationary. The operator of the device will take this into account in gauging the speed of both the haulage motor 39 and the hoisting motor 42 so that he may maintain the load or draft of cargo 48 at a proper height during the operation of the device. Automatic means may also be provided to run and gear the device to accomplish the same purpose. If such means are provided, they may be disconnected to permit the independent operation of the haulage motor 39 and the hoisting motor 42. The boom unit 26 is supported by support rollers 49 and guide rollers 50 which are, in turn, supported by bearing houses 51 and 52 attached to the stanchions 24. The rollers 49 and 50 have center flanges 53 and 54, respectively, which are used to align and secure the booms 27 by being seated in grooves 55. The guide rollers 50 are of such a length that they will permit clearance of the end sheaves 35 when the boom units 26 are drawn through and beyond any given set of rollers 49 and 50.

The boom units 26 may be locked in an operating position by boom locks 56. Each boom lock 56 consists of a locking pin 57 which is placed through a locking hole 58 and is moved in and out by means of threading 59 on the locking pin 57. When the locking pin 57 is rotated by means of the chain wheel 60 and hand chain 61, it moves in and out thereby locking and unlocking the boom unit 26 in and from a desired position.

I have provided a boom unit carrier 62 to transport the boom units 26 to various parts of the pier 20. The boom unit carrier 62 comprises a frame of side beams 63 which are connected to each other by end beams 64 attached to vertically disposed beams 65 and supporting wheels 66. The boom units 26 are supported and carried on the boom unit carrier 62 on supporting rollers 67 which are similar to and serve the same purposes as the supporting rollers 49. Upright plates 68 are provided at each side of the boom unit carrier 62 as additional strengthening means and to keep the boom units 26 in alignment. Channels 69, supporting tracks 70 run along the entire length of the pier. The wheels 66 ride on the tracks 70.

Power to move the boom unit carrier 62 is provided by a reversible electric motor 71 through a gear train or similar means encased in a gear case 72 attached to one of the side beams 63. A drive shaft 73 supported by shaft supports 74 connects the power means from the gear case 72 to a vertical shaft 75 by means of bevel gears 76. The vertical shaft 75 is supported by shaft supports 77 on one of the vertical beams 65 and drive one of the wheels 66 through means of the bevel gears 78.

The details of the electrical circuits or other power means and controls thereof are not a part of this invention. A multiple push button pendant suspended from the device may be used. However, it is sufficient for an understanding of the invention that the motors 39, 42 and 71, or other power means, are controlled in any conventional manner and the electrical circuits and control devices are therefore not shown.

My device operates in the following manner: A boom unit 26 which may happen to be resting on a boom unit carrier 62 is desired to be moved to a certain doorway 22. The boom unit carrier 62 is moved by means of power furnished by the motor 71 to the desired position so that the booms 27 of the boom unit 26 are in proper alignment with the support rollers 49 and guide rollers 50 so that the boom unit may be moved onto and supported by the mentioned rollers 49 and 50.

The boom unit 26 is transferred from the boom unit carrier 62 to the rollers 49 and 50 adjacent to the desired doorway 22 in the following manner: The movable roller 29 is moved to the extreme end of the boom unit 26 away from the doorway 22. The cargo wire 46 is led from the hoisting drum 41 around the movable roller 29 and is then carried by hand and temporarily secured to a point on the floor 21 relatively near the doorway 22. The hoisting motor 42 then moves the hoisting drum 41 to reel in the secured cargo wire 46. This will cause the entire boom unit 26 to move toward the secured end of the cargo wire 46 which is in the direction of the doorway 22. The movement is allowed to continue until the boom unit 26 is completely moved off the boom unit carrier 62 and extends through and beyond the doorway 22. The outer end of the boom unit 26 will now extend over the apron 23. The boom unit 26 is then locked to the stanchions 24 by rotating the chain wheel 60 so as to extend the locking pin 57 into the locking hole 58.

If cargo is to be discharged from a ship 79 utilizing its own cargo gear, the movable roller 29 is moved to the outer end of the boom unit 26 which projects over the apron 23. The draft of cargo 48 supported by the ship's cargo wire 80 is then lowered between the booms 27 and inside of the movable roller 29. The movable roller 29 is then moved inwardly and acts as a movable fairlead for the ship's cargo wire 80. The pier roller 25 guides the cargo wire 80 under the opening of the doorway 22 as the movable roller 29 leads the cargo wire 80 supporting the draft of cargo 48 into the pier shed 20. The movable roller 29 is then stopped and the cargo wire 80 is payed out to allow the cargo 48 to be lowered onto the floor 21. The cargo wire 80 is then unhooked from the cargo 48 and reeled back to the ship 79 for the next cargo draft. The procedure is repeated. If the first draft is still being broken down or sorted, my device permits the next draft to be deposited adjacent thereto. This eliminates any delay in waiting for the first draft to be cleared from the depositing area. In loading the ship, the above procedure is reversed.

In order to handle cargo from vessels, such as barges 47 which do not have their own cargo gear, I have provided the hoisting drum 41 and cargo wire 46. The boom unit 26 is disposed to extend over the vessel and is then locked in position. The cargo wire 46 is payed out from the hoisting drum 41 and caused to slide over the movable roller 29 as it is moved to the end of the boom unit 26 directly over the vessel 47. The cargo wire 46 is payed out until it is lowered onto the vessel and is then secured to the cargo 48 desired to be unloaded. The cargo wire 46 is then reeled in onto the hoisting drum 41. When the draft of cargo 48 reaches a height which clears the floor 21, the movable roller 29 is moved in toward the center of the pier at the same rate of speed that the cargo wire 46 is being reeled in, so that the draft of cargo 48 will be moved horizontally at a fixed desired height above the floor 21. The operator, by means of the usual type of control, controls the speed of movement of both the hoisting drum 41 and the movable roller 29 to produce the desired result; and at the desired point stops the movable roller 29 and permits the cargo wire 46 to be unreeled so as to allow the cargo 48 to be landed on the floor 21 and unhooked. This procedure is reversed when loading a vessel, such as a barge 47, which does not have cargo handling gear of its own.

If the pier shed 20 has low ceilings, it may be desirable to bring the boom units 26 as close to the ceiling as possible. An alternate shallower boom unit 26 may be provided by moving the motors 39 and 42, the gear case 40, the drums 36a and 36b and 41, to an end of the boom unit 26 where they could be placed between the booms 27. This would reduce the overall height of the unit 26 and permit it to be mounted much closer to the ceiling.

Another modification of my invention may be constructed for use in piers 20 where the stanchions 24 are widely spaced or where there are no interior stanchions 24 supporting the pier sheds 20. The boom units 26 in such case would be mounted carriages running on overhead tracks close to the door openings on both sides of the pier. This would eliminate the necessity of stanchion supports 24 for the boom units 26 since several boom units 26 could be moved the length of the pier on their own overhead tracks and yet be caused to project out of any desired door opening.

While a preferred form of the invention in all its respects has been described, there may be further equivalent constructions which may be employed without leaving the scope of the invention. I do not, therefore, want to be limited to the exact details as set forth herein, but desire to be protected for all constructions within the limits of the claim following:

Wherefore, I claim:

1. The combination of a structure: having at least one platform area, at least one dorway adjacent to the platform area, at least one pair of booms movably positioned for a part of their length through the mentioned doorway, said booms having at least one moveable roller carried by and positioned between them and adapted to be moved to any position along the length of the booms; with a cargo hoisting line adapted to bear a load, said cargo hoisting line depending from an independent hoisting apparatus outside of the mentioned structure; whereby when the roller is positioned outside the structure, the hoisting line and attached load may be lowered through the space between the roller and the dorway so that when the roller is shifted to within the structure, the hoist line is reeved about the roller and the load brought to a position over the platform.

2. The combination of a structure: having at least one platform area, at least one doorway adjacent to the platform area, at least one pair of booms movably positioned for a part of their length through the mentioned doorway, said booms having at least one movable roller carried by and positioned between them and adapted to be moved to any position along the length of the booms; with a cargo hoisting line adapted to bear a load, said cargo hoisting line depending from an independent hoisting apparatus outside of the mentioned structure; whereby when the roller is positioned outside the structure, the hoisting line and attached load may be lowered through the space between the roller and the doorway so that when the roller is shifted to within the structure, the hoist line is reeved about the roller and the load brought to a position over the platform; and power means to move the movable roller to different positions.

3. The combination of a structure: having at least one platform area, at least one doorway adjacent to the platform area, at least one pair of booms movably positioned for a part of their length through the mentioned doorway, said booms having at least one movable roller carried by and positioned between them and adapted to be moved to any position along the length of the booms; with a cargo hoisting line adapted to bear a load, said cargo hoisting line depending from an independent hoisting apparatus outside of the mentioned structure; whereby when the roller is positioned outside the structure, the hoisting line and attached load may be lowered through the space between the roller and the doorway so that when the roller is shifted to within the structure, the hoist line is reeved about the roller and the load brought to a position over the platform; and a boom carrier adapted to ride on tracks to transport the mentioned booms to desired positions within the structure.

4. The combination of a structure: having at least one platform area, at least one doorway adjacent to the platform area, at least one pair of booms movably positioned for a part of their length through the mentioned doorway, said booms having at least one movable roller carried by and positioned between them and adapted to be moved to any position along the length of the booms; with a cargo hoisting line adapted to bear a load, said cargo hoisting line depending from an independent hoisting apparatus outside of the mentioned structure; whereby when the roller is positioned outside the structure, the hoisting line and attached load may be lowered through the space between the roller and the doorway so that when the roller is shifted to within the structure the hoist line is reeved about the roller and the load brought to a position over the platform; and a boom carrier adapted to ride on tracks to transport the mentioned booms to desired positions within the structure; and power means to move the movable roller and the boom carrier.

5. The combination of a structure, having at least one platform, at least one doorway adjacent to the platform area, at least one pair of booms movably positioned for a part of their length through the mentioned doorway, said booms having at least one movable roller carried by and positioned between them and adapted to be moved to any position along the length of the booms; with a cargo hoisting line adapted to bear a load, said cargo hoisting line depending from an independent hoisting apparatus outside of the mentioned structure; whereby when the roller is positioned outside the structure, the hoisting line and attached load may be lowered through the space between the roller and the doorway so that when the roller is shifted to within the structure, the hoist line is reeved about the roller and the load brought to a position over the platform; and a boom carrier adapted to ride on tracks to transport the mentioned booms to desired positions within the structure; and said pairs of booms having mounted thereon at least one hoisting apparatus having a hoisting line.

References Cited in the file of this patent
UNITED STATES PATENTS

| Number | Name | Date |
| --- | --- | --- |
| 121,463 | Nicholson | Dec. 5, 1871 |
| 375,665 | Worth | Dec. 27, 1887 |
| 817,229 | Doyle | Apr. 10, 1906 |
| 1,305,631 | Travell | June 3, 1919 |
| 1,305,802 | Hulett | June 3, 1919 |
| 1,589,727 | Travell | June 22, 1926 |
| 1,900,867 | Olds | Mar. 7, 1933 |
| 1,975,636 | Fildes | Oct. 2, 1934 |
| 2,448,373 | Hurst | Aug. 31, 1948 |
| 2,541,893 | Speer | Feb. 13, 1951 |
| 2,669,363 | Kahlerth | Feb. 16, 1954 |